United States Patent [19]

Fujita et al.

[11] Patent Number: 5,095,522
[45] Date of Patent: Mar. 10, 1992

[54] OBJECT-ORIENTED PARALLEL PROCESSING SYSTEM, INCLUDING CONCEPT OBJECTS AND INSTANCE OBJECTS FOR MESSAGES EXCHANGING BETWEEN OBJECTS

[75] Inventors: Sumikazu Fujita; Shigeru Oyanagi; Takashi Suzuoka, all of Yokohama; Sadao Nakamura, Yamato, all of Japan

[73] Assignee: Kabushiki Kaisha Toshiba, Kawasaki, Japan

[21] Appl. No.: 213,115

[22] Filed: Jun. 28, 1988

[30] Foreign Application Priority Data

Jun. 30, 1987 [JP] Japan ................... 62-162868

[51] Int. Cl.⁵ .................. G06F 13/00; G06F 13/14
[52] U.S. Cl. ...................... 395/200; 364/DIG. 1; 364/284.3; 364/284; 364/229.2; 364/229; 364/280.2; 364/280; 364/281.3
[58] Field of Search ... 364/200 MS File, 900 MS File

[56] References Cited

U.S. PATENT DOCUMENTS

| 4,644,468 | 2/1987 | Doster et al. | 364/200 |
| 4,766,534 | 8/1988 | DeBenedictis | 364/200 |
| 4,791,550 | 12/1988 | Stevenson et al. | 364/200 |
| 4,835,685 | 5/1989 | Kun | 364/200 |

*Primary Examiner*—Kevin A. Kriess
*Attorney, Agent, or Firm*—Foley & Lardner

[57] ABSTRACT

An object-oriented system comprises concept and instance objects allocated to a plurality of processors to form a network. Each of the processors comprises a transmission-reception portion for transmitting and receiving messages, an object control portion for managing concept and instance objects, an inheritance retrieval portion for recording and retrieving information inherited from upper concept objects, a message pattern retrieval portion for retrieving message patterns, a message procedure storage portion for storing procedures corresponding to the message patterns, and an instance object storage portion for storing instance variables that hold internal states of the instance objects.

10 Claims, 7 Drawing Sheets

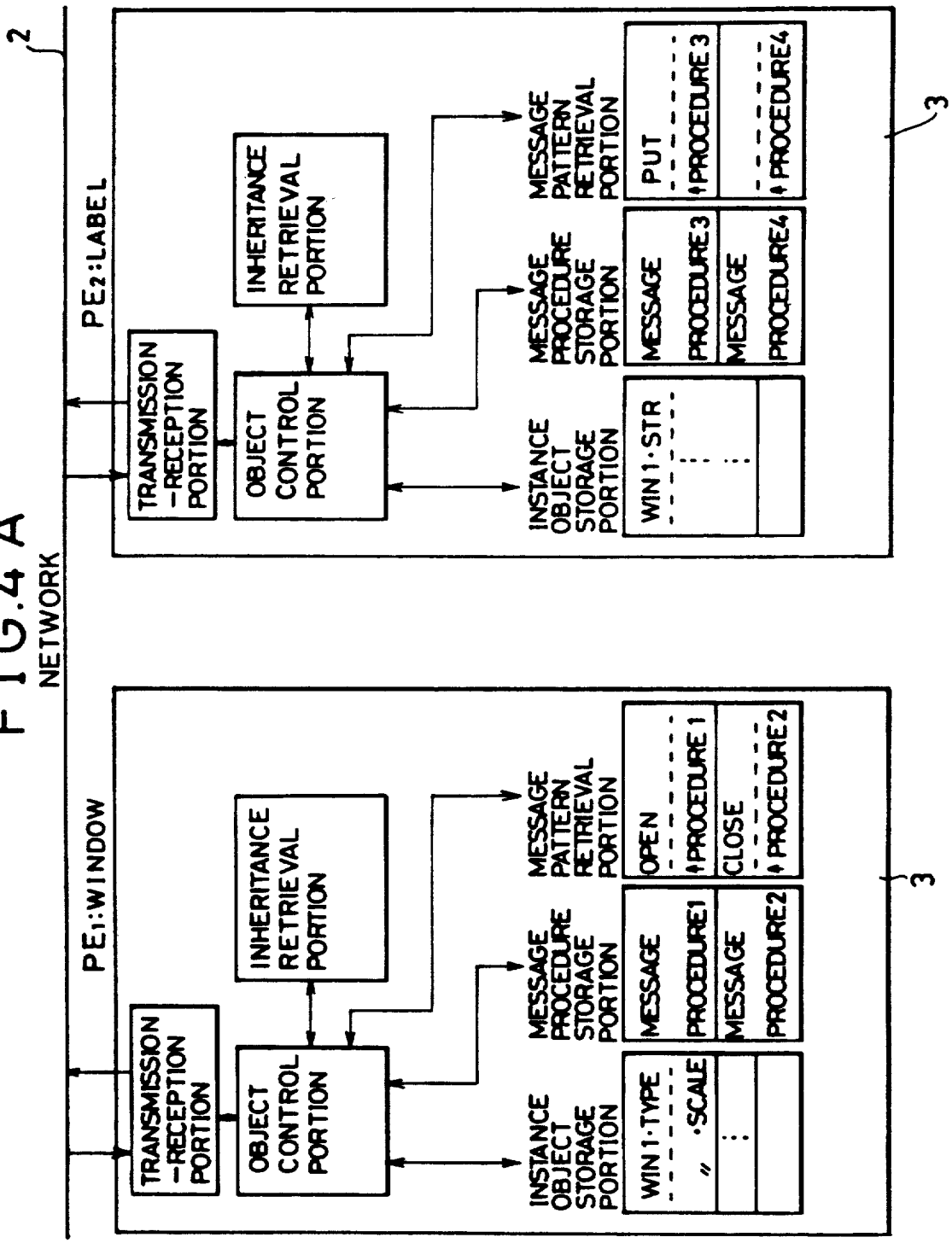

FIG 4.B
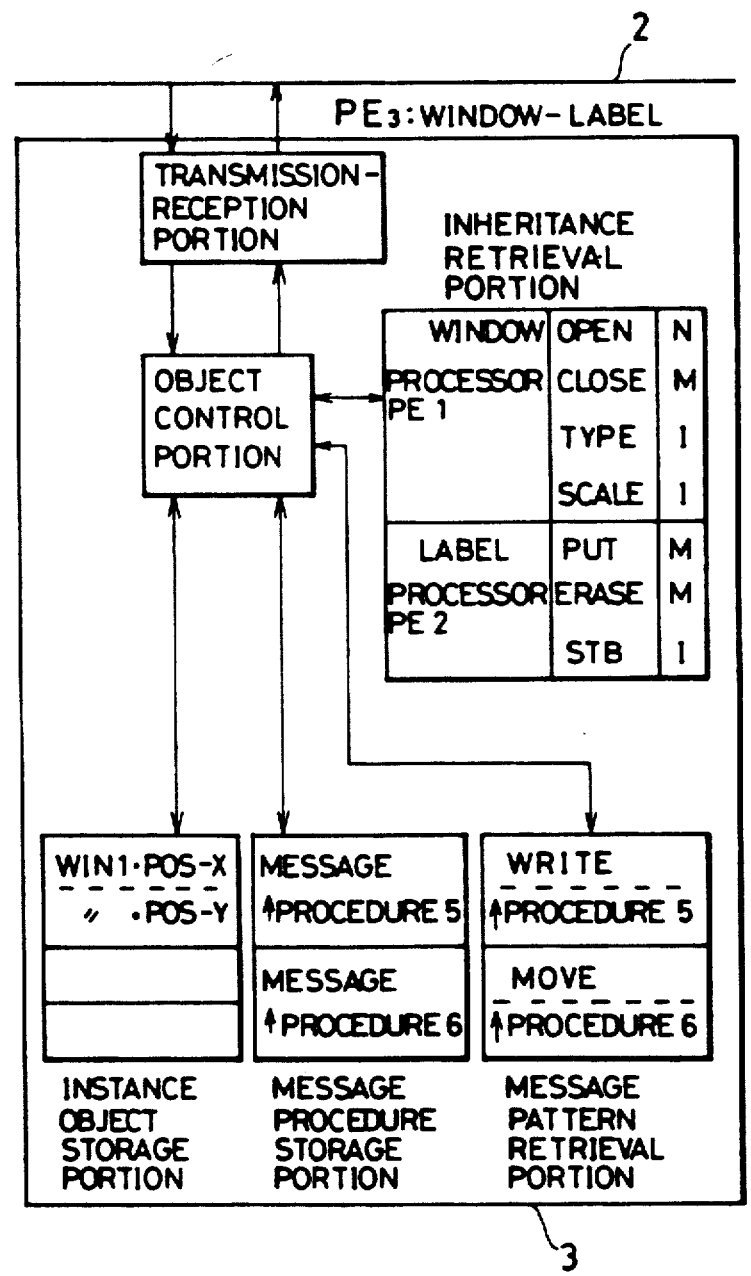

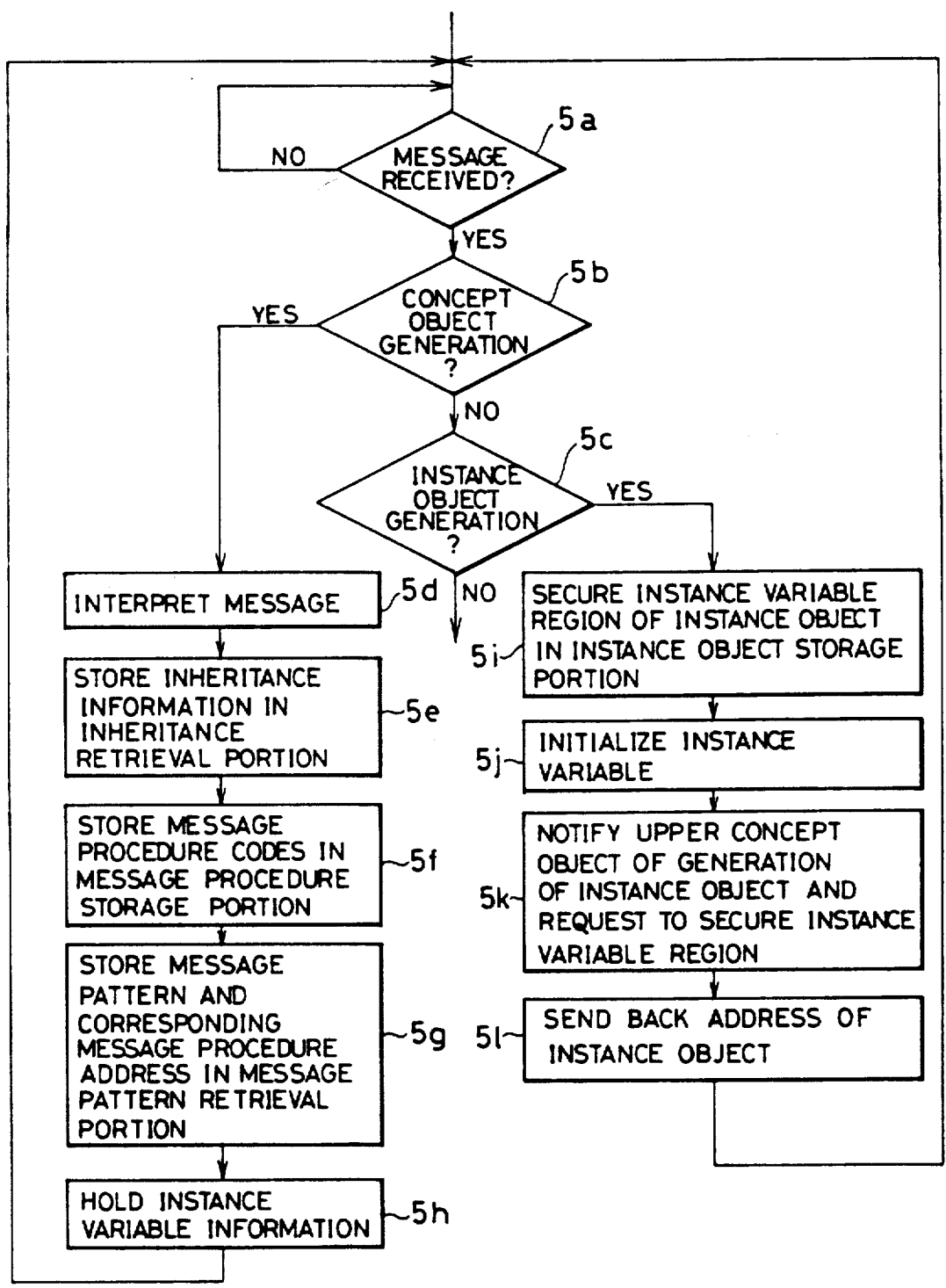

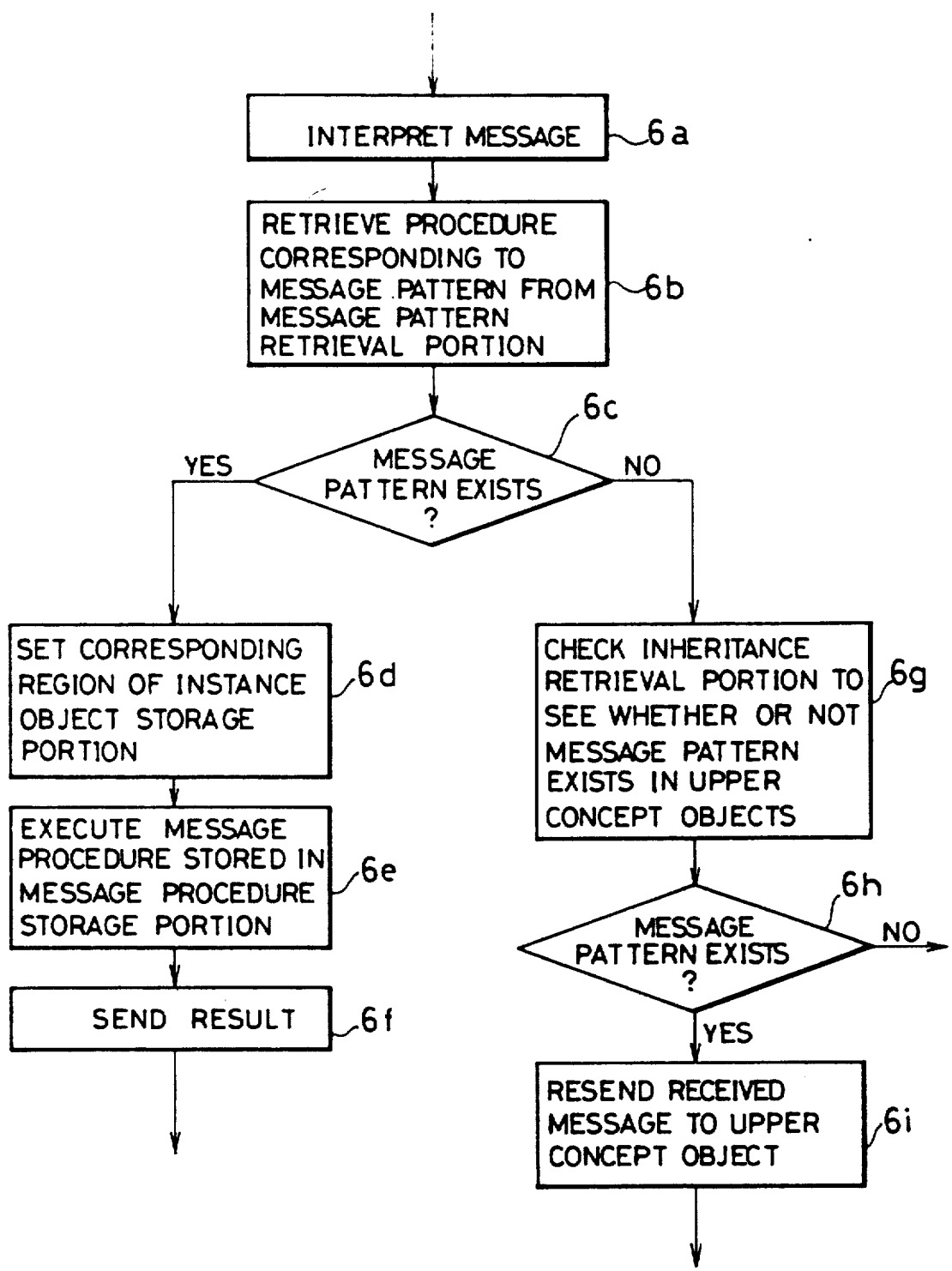

FIG.7

| MESSAGE PATTERN | MESSAGE PROCEDURE |
|---|---|
| MOVE ⟶ | POS-X = POS-X + X <br> POS-Y = POS-Y + Y |

FIG.8

| MESSAGE PATTERN | MESSAGE PROCEDURE |
|---|---|
| CLOSE ⟶ | TYPE = 0 <br> SCALE = 0 <br> CLEAR-WINDOW |

OBJECT-ORIENTED PARALLEL PROCESSING SYSTEM, INCLUDING CONCEPT OBJECTS AND INSTANCE OBJECTS FOR MESSAGES EXCHANGING BETWEEN OBJECTS

BACKGROUND OF THE INVENTION

1. Field of the Invention

The present invention relates to an object-oriented system that exchanges messages between objects to carry out processing, and particularly to an object-oriented parallel processing system that uses a plurality of processors to carry out parallel processing.

2. Description of the Prior Art

In recent years, the object-oriented systems are being used in knowledge bases, CAIs and prototype making. The object-oriented systems are expected to rapidly progress in various fields.

In the object-oriented system, messages are sent and received between objects having certain functions and knowledges to carry out processes such as arithmetic operations.

When one of the objects receives a message, the object carries out an operation (a message procedure) corresponding to the message and, if necessary, returns a result of the operation. Each object has a region where internal states (instance variables) of the object itself are stored and where the other objects are not allowed to access. The objects comprise concept objects that represent concepts and instance objects that represent instances of the concept objects. The concepts are clearly separated from the instances.

One feature of the object-oriented system is an inheritance. With respect to a certain concept object, there is defined an upper concept object that has a concept more abstractive than a concept held by the certain concept object, and the certain object can inherit the functions (message procedures) and knowledges (instance variables) of the upper concept object to utilize them. For example, a concept object "cheetah" may inherit functions and knowledges from its upper concept objects "mammal", "carnivore" and "animal".

The object-oriented system is essentially appropriate for carrying out parallel processing. Namely, the system exchanges messages between objects that are highly independent of each other and provided with computing substances. However, although the system has the parallel processing ability, the system has a drawback that its processing speed is slow, because it is conventionally operated on a single sequential computer.

With the development of high function high-speed processors, object-oriented parallel processing machines have been proposed. However, the conventional machines do not distinguish concept objects from instance objects and do not realize inheritance mechanisms. Due to this, there are the problems of double codes and complicated descriptions.

In addition, since the conventional object-oriented systems are realized on single exclusive sequential computers as mentioned before, they need a long execution time.

SUMMARY OF THE INVENTION

An object of the present invention is to provide an object-oriented parallel processing system that can solve the above-mentioned problems. This system comprises a plurality of processors effectively assigned for objects respectively to inherit information of upper objects, thereby realizing high-speed processing.

Another object of the present invention is to provide an object-oriented parallel processing system comprising a plurality of processors that operate in parallel with each other to carry out high-speed processing.

According to the present invention, each processor comprises a transmission-reception portion for transmitting and receiving messages, an object control portion for managing concept and instance objects, an inheritance retrieval portion for recording and retrieving information inherited from upper concept objects, a message pattern retrieval portion for retrieving message patterns, a message procedure storage portion for storing procedures corresponding to the message patterns, and an instance object storage portion for storing instance variables that hold internal states of the instance objects. The processors each assigned for the concept and instance objects are connected to each other to form a network.

In the system of the present invention, a concept object is defined at first. Then, a processor where the concept object is to be generated is selected, and a concept object generating message is transmitted to the selected processor thought the network. The object control portion of the selected processor receives the message through the transmission-reception portion of the processor.

The object control portion interprets the message to find the inheritance information of upper concept objects out of the message, and stores the inheritance information in the inheritance retrieval portion. The inheritance information includes information about the upper concept objects from which the inheritance information has come and information about functions (message procedures) of the upper concept objects.

At the same time, the object control portion stores message procedures defined for the concept object to be generated, in the message procedure storage portion through the message pattern retrieval portion.

After the completion of the generation of the concept object, computing processes are started to generate instance objects. To the processor where the concept object has just been generated, an instance object generating message is sent to generate an instance object that represent an instance of the concept object just generated. After receiving the message, the object control portion of the processor secures a region in the instance object storage portion to store instance variables that hold an internal state of the instance object. The secured region is initialized to generate the instance object. After that, an address of the instance object is sent back to a sender of the instance object generating message.

In this way, instance objects are successively generated on the individual processors, and the instance objects are operated in parallel with each other to exchange messages between the objects, thus executing computing processes.

Namely, when a general message other than the object generating messages is supplied to any processor with instance objects generated, the object control portion of the processor retrieves, through the message pattern retrieval portion, a message procedure corresponding to the received message out of the message procedure storage portion. If the corresponding message procedure is successfully retrieved, it is sent back to a sender of the message.

However, if the corresponding message procedure is not retrieved in the message procedure storage portion, the object control portion of the processor starts to search the inheritance retrieval portion for an upper concept object having the corresponding message procedure. If the upper concept object is searched successfully, the object control portion sends the received message to a processor assigned for the upper concept object just found to request the processor to process the message. Then, the processor assigned for the upper concept object receives the message and returns the corresponding message procedure to the demander.

In this way, the present invention allocates concept and instance objects to a plurality of processors, and the objects are operated in parallel with each other to realize a high-speed operation.

In addition, according to the present invention, one processor is assigned for one concept object and instances of the concept object so that method codes may commonly be used to reduce a storage capacity, and the method codes and instance variables may dynamically be changed.

These and other objects, features and advantages of the present invention will become apparent from the following description of a preferred embodiment taken in conjunction with the accompanying drawings.

BRIEF DESCRIPTION OF THE DRAWINGS

FIGS. 4A and 4B are views showing states of processors to which the concept objects of FIG. 3 are allocated respectively;

FIG. 5 is a flowchart showing a process of generating concept and instance objects;

FIG. 6 is a flowchart showing a process of exchanging a message between objects; and FIGS. 7 and 8 are views showing examples of message procedures, respectively.

DETAILED DESCRIPTION OF THE PREFERRED EMBODIMENTS

Figure 1:
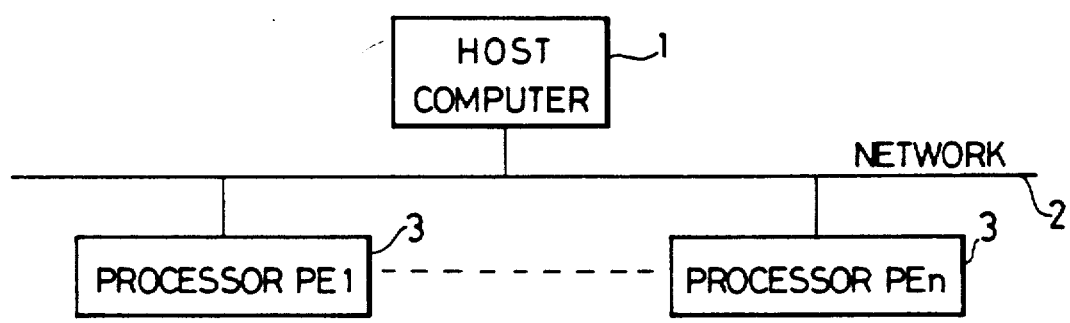
FIG. 1 is a view showing the general constitution of an object-oriented parallel processing system according to an embodiment of the present invention.

FIG. 1 is a view showing the constitution of an object-oriented parallel processing system according to the present invention. In the figure, a host computer 1 is connected to a plurality of processors 3 through a network 2. The host computer 1 controls the object-oriented parallel processing system. Through the host computer 1, a user of the system can generate, update and compute concept and instance objects.

In each of the processors 3, there are generated one concept object and a plurality of instance objects representing instances of the concept object.

Figure 2:
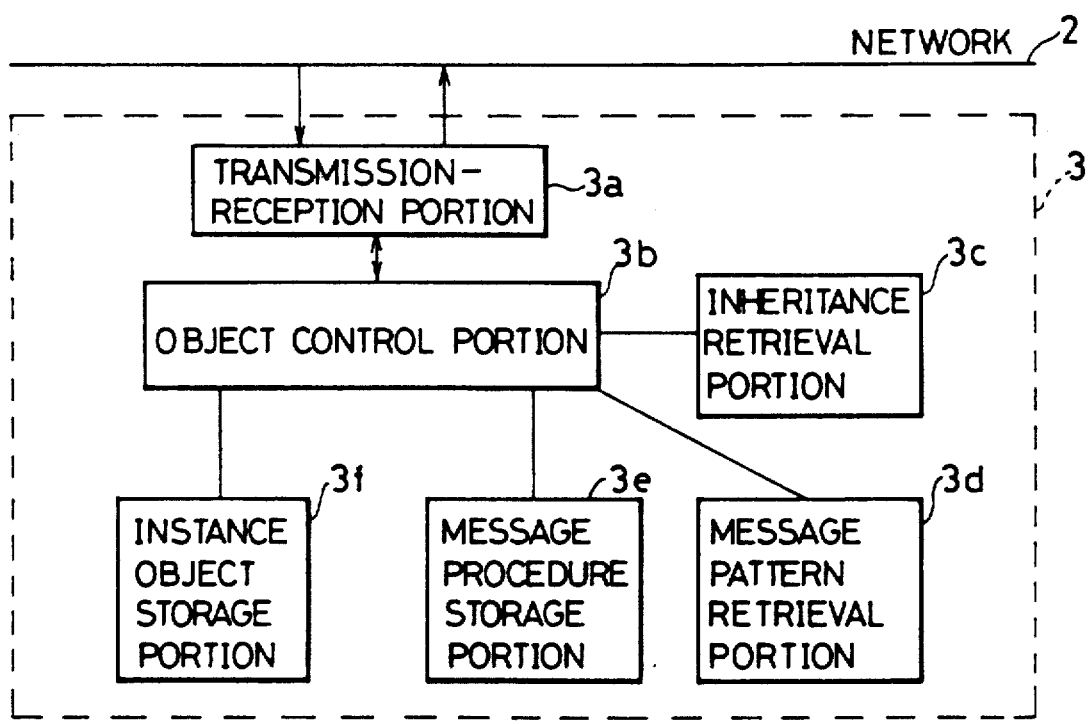
FIG. 2 is a view showing the constitution of one of processors of the system shown in FIG. 1.

As shown in FIG. 2, the processor 3 comprises a transmission-reception portion 3a, an object control portion 3b, inheritance retrieval portion 3c, a message pattern retrieval portion 3d, a message procedure storage portion 3e and an instance object storage portion 3f.

The transmission-reception portion 3a is an I/O (input/output) portion that receives a message transmitted through the network 2 and transmits a message from the object control portion 3b to the network 2.

The object control portion 3b manages the concept and instance objects generated in the processor 3 and controls all the components in the processor 3.

The inheritance retrieval portion 3c records inheritance information inherited from other upper concept objects and retrieves the inheritance information. This inheritance information includes information about the upper concept objects from where the inheritance information has come and information about functions (message procedures) of the upper concept objects.

The message pattern retrieval portion 3d records and retrieves message patterns to be used for identifying an input message, and addresses of message procedures corresponding to the message patterns.

The message procedure storage portion 3e stores the message procedures corresponding to the message patterns.

The instance object storage portion 3f stores instance variables for holding internal states of the instance objects.

The object control portion 3b controls the transmission-reception portion 3a, inheritance retrieval portion 3c, message pattern retrieval portion 3d, message procedure storage portion 3e and instance object storage portion 3f.

Figure 3:
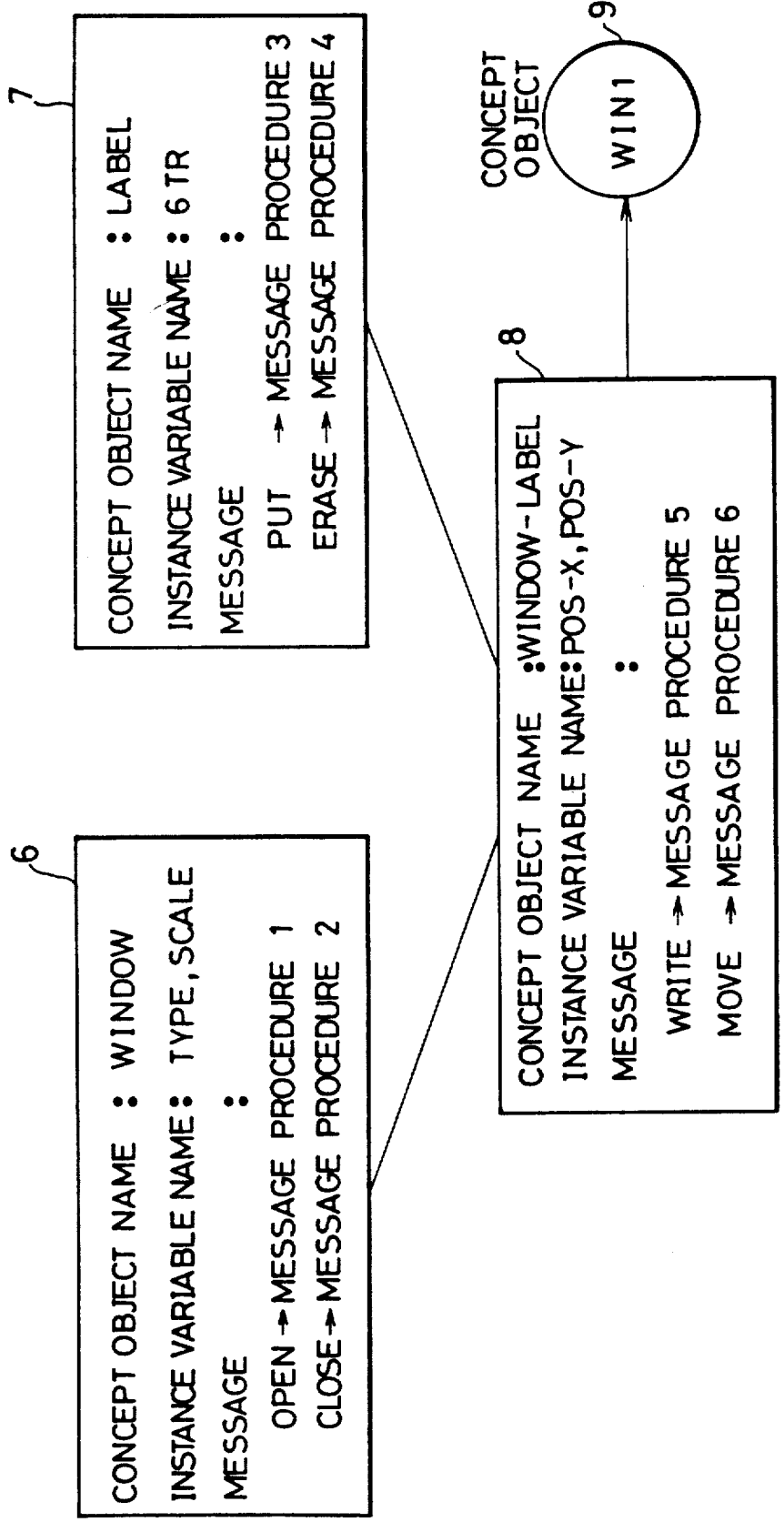
FIG. 3 is a view showing an example of the hierarchy of concept objects.

FIG. 3 is a view showing a hierarchy of the concept objects. In the figure, a concept object WINDOW 6 and a concept object LABEL 7 are commonly upper concept objects of a concept object WINDOW-LABEL 8. The concept object WINDOW-LABEL 8 holds instance variables POS-X and POS-Y as well as procedures defined for message patterns WRITE and MOVE. The concept object LABEL 7 holds an instance variable STR and procedures defined for message patterns PUT and ERASE. The concept object WINDOW 6 holds instance variables TYPE and SCALE and procedures defined for message patterns OPEN and CLOSE.

As explained in the above, the upper concept objects of the concept object WINDOW-LABEL 8 are the concept objects WINDOW 6 and LABEL 7 so that the concept object WINDOW-LABEL 8 inherits information about the instance variables TYPE, SCALE and STR and procedures 1 to 4 defined for the message patterns OPEN, CLOSE, PUT and ERASE of the concept objects WINDOW 6 and LABEL 7. In FIG. 3, a reference mark WIN 9 represents an instance object belonging to the concept object WINDOW-LABEL 8.

FIG. 4 is a view showing the concept objects 6 to 8 and the instance object 9 generated in the system of the present invention.

Namely, a user may define concept objects such as those shown in FIG. 3 on the host computer 1. Then, the host computer 1 secures processors which are not in use, for the defined concept objects. In the figure, a processor PE1 is assigned for the concept object WINDOW, a processor PE2 for the concept object LABEL, and a processor PE3 for the concept object WINDOW-LABEL.

Firstly, to generate the concept object WINDOW-LABEL, the host computer 1 transmits the following message to the processor PE3:

(make - concept object WINDOW-LABEL, instance variables (POS-X, POS-Y), procedures ((WRITE, message procedure 5), (MOVE, message procedure 6), inheritance information ((WINDOW; instance variables (TYPE, SCALE), procedures ((OPEN, message procedure 1), (CLOSE, message procedure 2))), (LABEL;

instance variable (STR), procedures ((PUT, message procedure 3), (ERASE, message procedure 4))))).

After receiving this the message, the processor PE3 proceeds step shown in a flowchart of FIG. 5.

A transmission-reception portion 3a of the processor PE3 receives the message (step 5a). An object control portion 3b of the processor PE3 checks to see whether or not the message is a concept object generating message (step 5b). If it is YES, the object control portion 3b interprets the message (step 5d) and stores the inheritance information related to the upper concept objects WINDOW and LABEL in an inheritance retrieval portion 3c (step 5e). This inheritance information comprises, as shown in FIG. 4, information 10a about functions (message procedures) of the upper concept objects WINDOW and LABEL, and information 10b about the upper concept objects WINDOW and LABEL (processors PE1 and PE2) themselves from where the inheritance information has come.

After that, the object control portion 3b stores the message procedures 5 and 6 contained in the received message in a message procedure storage portion 3e (step 5f). Then, the message patterns (WRITE, MOVE) and pointers for the message procedures 5 and 6 corresponding to the message patterns are stored in a message pattern retrieval portion 3d (step 5g). The instance variables (POS-X, POS-Y) are stored in an instance object storage portion 3f (step 5h). All of these operations are carried out under the control of the object control portion 3b.

In the similar manner, the concept object WINDOW 6 and the concept object LABEL 7 are generated in the processors PE1 and PE2, respectively.

After the generation of the concept objects, calculation is started. In the calculation, instance objects are dynamically generated. For example, to generate an instance object WIN1 that is an instance of the concept object WINDOW-LABEL, the following message is transmitted to the processor PE3:

(make - instance object, concept object WINDOW-LABEL (address, processor), instance variables (POS-X, 0), (POS-Y, 0))).

When this message is received by the object control portion 3b of the processor PE3, the processor PE3 secures a region for the instance variables (POS-X, POS-Y) in the instance object storage portion 3f (step 5i) of the processor PE3, and initializes the instance variables POS-X and POS-Y to "0" (step 5j). Then, to the concept objects WINDOW 6 and LABEL 7 that are the upper concept objects of the concept object WINDOW-LABEL 8, the processor PE3 sends the following messages to notify them of the completion of the generation of the instance variables as well as requesting them to secure regions for the inherited instance variables (step 5k):

(alloc WINDOW WIN1, instance variables ((TYPE, ven) (SCALE, 100))), (alloc LABEL WIN1, instance variable ((STR, graphic"))).

After receiving these messages, the processors for the concept objects WINDOW 6 and LABEL 7 secure regions for the instance variables (TYPE, SCALE and STR) for the instance object WIN1 to initialize the regions.

The, the object control portion 3b of the processor PE3 sends an address of the instance object WIN1 back to a sender of the message requesting the generation of the instance object WIN1 (step 5l).

In this way, instance objects are generated successively on the processors. These instance objects operate in parallel with each other to carry out calculations.

FIG. 6 is a flowchart showing how the instance object handles a general message.

Supposing the following message requesting a window to move is transmitted to the instance object WIN1:

(MOVE WIN1, arguments ((X, 10), (Y, 20))).

Then, the object control portion 3b of the processor PE3 receives and interprets the message (step 6a), and requests the message pattern retrieval portion 3d to retrieve a message procedure corresponding to a message pattern (MOVE) of the message. The message pattern retrieval portion 3d retrieves a message procedure 6 corresponding to the message pattern (MOVE) (steps 6b and 6c) and sends an address of the message procedure 6 back to the object control portion 3b.

The object control portion 3b sets a corresponding region of the instance object WIN1 9 of the instance object storage portion (step 6d), loads the message procedure 6 from the message procedure storage portion 3e according to the address given by the message pattern retrieval portion 3d, executes the message procedure 6 (step 6e), and returns a result of the execution to a sender of the message (step 6f). Variables that may be referred to by the message procedure 6 are the arguments (X, Y) of the message, and the instance variables of the instance object storage portion 3f set by the object control portion 3b. FIG. 7 is a view showing the message procedure with respect to the message pattern MOVE. After the execution of this message procedure, the instance variable POS-X is set to 10 and the instance variable POS-Y to 20.

Next, supposing the following message for requesting the window to close is sent to the instance object WIN1:

(CLOSE WIN1).

The object control portion 3b of the processor PE3 receives this message through the transmission-reception portion 3a and interprets the message (step 6a). The object control portion 3b then requests the message pattern retrieval portion 3d to retrieve a message procedure corresponding to the message pattern CLOSE (step 6b). The message pattern retrieval portion 3d checks to see whether or not the message pattern CLOSE is in the stored information. Since the message pattern CLOSE is not in it, the message pattern retrieval portion 3d informs of the nonexistence to the object control portion 3b.

Then, the object control portion 3b requests the inheritance retrieval portion 3c to retrieve the message pattern CLOSE in the information inherited from the upper concept objects (step 6g).

The inheritance retrieval portion 3c checks to see whether or not the message pattern CLOSE exists in the inherited information (step 6h). Since the message pattern CLOSE is in the information 10a shown in FIG. 4, and since the information 10b indicates an upper concept object (in this example, WINDOW of the processor PE1) from where the message pattern CLOSE has come, the inheritance retrieval portion 3c sends an address (processor PE1) of the concept object WINDOW 6 in which the message pattern CLOSE is defined, back to the object control portion 3b.

The object control portion 3b resends the above-mentioned message "CLOSE WIN1" to the concept object WINDOW 6, i.e., the processor PE1 (step 6i).

An object control portion 3b of the processor PE1 receives the message. Then, the steps 6a to 6f mentioned in the above are repeated in the processor PE1. FIG. 8 shows a message procedure for the message pattern CLOSE. When this is executed, the instance variables TYPE and SCALE are set to 0.

In this way, concept and instance objects are generated in the individual processors to process general messages. By using the system of the present invention, many concept objects and instance objects are stored in a plurality of processors that are interconnected through a network of a parallel processing system, and the processors operate in parallel with each other to exchange messages. An inheritance function is realized in this object-oriented parallel processing system.

In summary, the present invention installs a parallel processing system with a network of plural processors each being assigned for a concept object and instance objects related to the concept object, thus efficiently allocating many concept and instance objects to the network to commonly use codes and variables, and operating the objects in the individual processors in parallel with each other to realize a high-speed computation.

In addition, according to the present invention, each processor is not required to hold the knowledges (instance variables) and functions (message procedures) of upper concept objects, but they may be stored in processors assigned for the upper concept objects. When receiving a message requiring the knowledges and functions of the upper concept objects, the processor in question may resend the message to the processors assigned for the upper concept objects and request the processors assigned for the upper concept objects to execute the message. Thus, it will be easy to dynamically change the inheritance functions and knowledges.

Various modifications will become possible for those skilled in the art after receiving the teachings of the present disclosure without departing from the scope thereof.

What is claimed is:

1. In an object-oriented parallel processing system comprising a plurality of objects each carrying out operations with respect to a corresponding concept and exchanging, with other objects, messages indicative of what operation should be carried out through an intercommunication network, the concepts allotted to said objects forming at least in part a hierarchy so that an operation of a higher level concept is part of the operations of a lower level concept, the object of said lower level concept comprising:
   a transmission-reception portion through which an object exchanges messages with another object;
   first means for storing information necessary for carrying out operations with respect to said lower level concept;
   second means for determining correspondence between said operations with respect to said lower level concept and messages received by said transmission-reception portion;
   third means or storing a result of said operations;
   fourth means for storing information about said higher level concept, said information including information necessary to determine correspondence between an operation with respect to said higher level concept and messages received by said transmission-reception portion and information for determining an object which carries out said operation with respect to said higher level concept; and
   an object control portion connected with said transmission-reception portion and said first, second, third and fourth means of said object and controlling said transmission-reception portion and all said means to perform their tasks respectively.

2. The object-oriented parallel processing system as claimed in claim 1, further comprising an inheritance retrieval portion for storing inheritance information comprising information about message procedures of upper concept objects from where said inheritance information has been inherited, information indicating said upper concept objects, and instance variables.

3. The object-oriented parallel processing system as claimed in claim 1, wherein, said object control portion performs control such that when a concept object generating message is supplied from external apparatus or from one of other processors to any one of processors, concept object information contained in a message is interpreted to store inheritance information related to upper concept objects in said inheritance retrieval portion and message procedures defined for a concept object to be generated is stored in a message procedure storage portion through a message pattern retrieval portion to generate said concept object.

4. The object-oriented parallel processing system as claimed in claim 3, wherein inheritance information stored in said inheritance retrieval portion comprises information about message procedures of said upper concept objects from where inheritance information has been inherited to a concept object and information indicating said upper concept objects.

5. The object-oriented parallel processing system as claimed in claim 1, further comprising connection means including a network for connecting processors to each other in parallel.

6. The object-oriented parallel processing system as claimed in claim 3, wherein, when an instance object generating message is supplied from external apparatus or from one of other processors to a processor in which said concept object has been generated, said instance object storage portion, a region for instance variables that hold an internal state of an instance object and generates said instance object by initializing said region.

7. The object-oriented parallel processing system as claimed in claim 6, wherein inheritance information stored in said inheritance retrieval portion comprises information about message procedures of said upper concept objects from where inheritance information has been inherited to a concept object and information indicating said upper concept objects.

8. The object-oriented parallel processing system as claimed in claim 7, further comprising connection means including a network for connecting processors to each other in parallel.

9. A parallel, processing method for an object oriented parallel processing system comprising a plurality of objects each carrying out operations with respect to a corresponding concept and exchanging with other objects, messages indicative of what operation should be carried out through an intercommunication network, the concepts allotted to said objects forming at least in part a hierarchy so that an operation of a higher level concept is part of the operations of a lower level concept, said method comprising the steps of:
   exchanging messages by an object with another object through a transmission-reception portion;

storing information necessary for carrying out operations with respect to said lower level concept in first storage means;

determining correspondence between said operations with respect to said lower level concept and messages received by said transmission-reception portion in correspondence determining means;

storing a result of said operation in second storage means;

storing information, in third storage means, about said higher level concept, said information including information necessary to determine correspondence between an operation with respect to said higher level concept and messages received by said transmission-reception portion and information for determining an object which carries out said operation with respect to said higher level concept; and controlling said transmission-reception portion, said first, second and third means and said determining means to perform their tasks respectively by an object control portion connected thereto.

10. The parallel processing method as claimed in claim 9, further comprising:

storing inheritance information in an inheritance retrieval portion, said information including information about message procedures of upper concept objects from where said inheritance information has been inherited and information indicating said upper concept objects.

* * * * *